United States Patent
Chun

(10) Patent No.: US 8,326,241 B2
(45) Date of Patent: Dec. 4, 2012

(54) METHOD AND APPARATUS FOR DETERMINING WHETHER MOBILE TERMINAL NORMALLY OPERATES

(75) Inventor: Jong-Wook Chun, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 224 days.

(21) Appl. No.: 12/821,592

(22) Filed: Jun. 23, 2010

(65) Prior Publication Data

US 2011/0003565 A1 Jan. 6, 2011

(30) Foreign Application Priority Data

Jul. 6, 2009 (KR) .................. 10-2009-0060988

(51) Int. Cl.
*H04B 17/00* (2006.01)
(52) U.S. Cl. ............. 455/115.3; 455/552.1; 455/68; 455/103; 455/127.1; 455/127.2

(58) Field of Classification Search ............ 455/115.3, 455/552.1, 68, 103, 127.1
See application file for complete search history.

(56) References Cited

U.S. PATENT DOCUMENTS

| | | | | |
|---|---|---|---|---|
| 5,222,104 | A * | 6/1993 | Medendorp | 375/308 |
| 5,710,990 | A * | 1/1998 | Long et al. | 455/103 |
| 2008/0139128 | A1* | 6/2008 | Liao | 455/68 |
| 2008/0207258 | A1* | 8/2008 | Rofougaran | 455/552.1 |

* cited by examiner

*Primary Examiner* — Sanh Phu
(74) *Attorney, Agent, or Firm* — Jefferson IP Law, LLP

(57) ABSTRACT

A method and an apparatus for determining whether a mobile terminal operates normally are provided. The method includes generating a transmission signal, isolating, at a Front End Module (FEM), the transmission signal provided to an antenna, and outputting the same, measuring a level of the output signal, and comparing the measured level of the output signal with a preset threshold level to determine that at least one of a Power Amplifier Module (PAM) and the FEM operates normally.

16 Claims, 4 Drawing Sheets

METHOD AND APPARATUS FOR DETERMINING WHETHER MOBILE TERMINAL NORMALLY OPERATES

PRIORITY

This application claims the benefit under 35 U.S.C. §119(a) of a Korean patent application filed in the Korean Intellectual Property Office on Jul. 6, 2009 and assigned Serial No. 10-2009-0060988, the entire disclosure of which is hereby incorporated by reference.

BACKGROUND OF THE INVENTION

1. Field of the Invention

The present invention relates to a method and an apparatus for determining whether a mobile terminal operates normally. More particularly, the present invention relates to a method and an apparatus for determining whether a Front End Module (FEM) or a Power Amplifier Module (PAM) of a Radio Frequency (RF) end operates normally.

2. Description of the Related Art

To meet customer demands for products that are miniaturized and have a slim profile and are provided with advanced functions based on the development of Very Large Scale Integration (VLSI) and computing technology, mobile terminals of various small sizes have been available and a demand thereof has rapidly increased.

A mobile terminal may not operate normally due to an external impact (e.g., vibration, a fall, and the like). Also, as time elapses, characteristics of the mobile terminal's hardware deteriorate and the mobile terminal may not operate normally. According to the related art, when hardware abnormalities are generated in a mobile terminal due to an external impact or the passage of time, a service center is normally used to solve the abnormalities. The service center should use high-priced equipment, e.g., communication test equipment, a spectrum analyzer, a power supply, a Personal Computer (PC), and the like, for analyzing the hardware abnormalities of the mobile terminals. However, since most service centers do not have the above-described high-priced equipment, the service centers cannot analyze the hardware abnormalities of the mobile terminal. Therefore, problems are diagnosed based on a serviceman's intuition and experience which can be inaccurate. Also, most servicemen solve diagnosed problems by simply replacing a mainboard of the mobile terminal which generates unnecessary monetary waste. In addition, even when the high-priced equipment is available, an increased amount of time is taken to analyze the hardware abnormalities accurately according to the related art.

Therefore, a need exists for an apparatus and method for reducing time taken to analyze hardware abnormalities and monetary waste when determining whether a mobile terminal operates normally.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for determining whether a mobile terminal operate normally.

Another aspect of the present invention is to provide a method and an apparatus for determining a characteristic deterioration of hardware in a mobile terminal using key manipulation.

Still another aspect of the present invention is to provide a method and an apparatus for determining whether a Front End Module (FEM) or a Power Amplifier Module (PAM) operate normally in a mobile terminal.

Yet another aspect of the present invention is to provide a method and an apparatus for determining whether an FEM or a PAM operate normally by measuring a level of a transmission signal through a redundant port of the FEM in a mobile terminal.

A further aspect of the present invention is to provide a method and an apparatus for providing a feedback signal to a PAM through a redundant port of an FEM in a mobile terminal.

In accordance with an aspect of the present invention, a method for determining whether a mobile terminal operate normally is provided. The method includes generating a transmission signal, isolating, at an FEM, a transmission signal provided to an antenna, and outputting the same, measuring a level of the output signal, and comparing the measured level of the signal with a preset threshold level to determine that at least one of a PAM and the FEM operates normally.

In accordance with another aspect of the present invention, an apparatus for determining whether a mobile terminal operate normally is provided. The apparatus includes a Radio Frequency (RF) unit for generating a transmission signal, an FEM for providing the transmission signal generated by the RF unit to an antenna, for isolating the transmission signal provided to the antenna, and for outputting the same, and a controller for measuring a level of a signal output from the FEM, and for comparing the measured level of the signal with a preset threshold level to determine that at least one of a PAM and the FEM operate normally.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technique for determining whether a Front End Module (FEM) or a Power Amplifier Module (PAM) operate normally by measuring a level of a transmission signal through a redundant port of the FEM in a mobile terminal.

Figure 1:
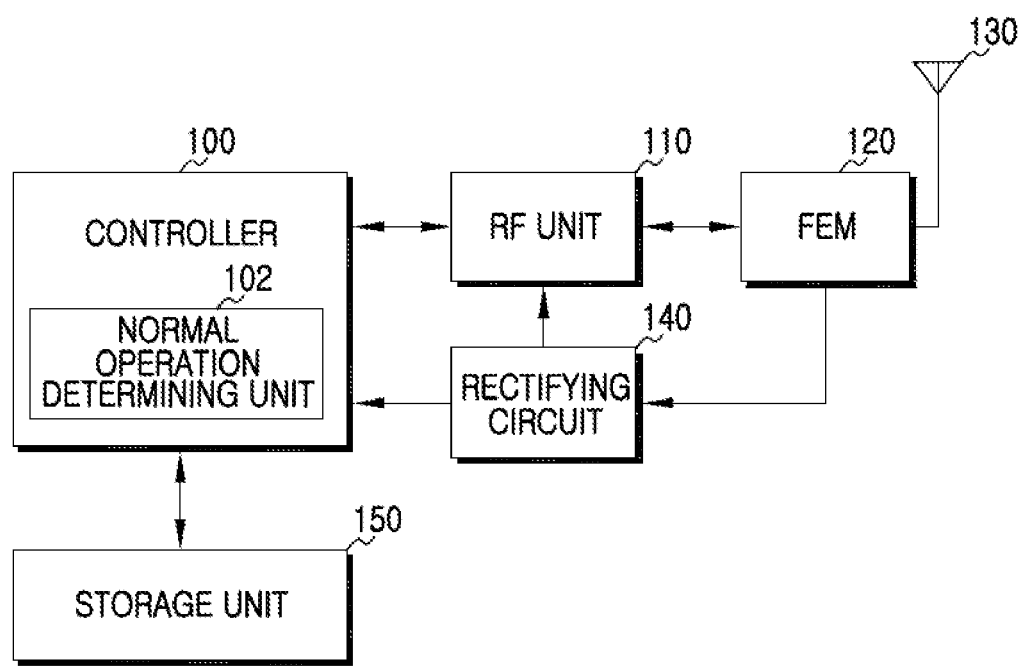
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal includes a controller 100, an RF unit 110, an FEM 120, an antenna 130, a rectifying circuit 140, and a storage unit 150. The controller 100 includes a normal operation determining unit 102.

The controller 100 controls and processes an overall operation of the mobile terminal. In addition, when an event for determining whether a hardware unit operate normally occurs, for example, by input from a user, the controller 100 controls and processes a function for generating a transmission signal to determine whether the FEM 120 or a Power Amplifier Module (PAM) (not illustrated) operates normally by executing a function of the normal operation determining unit 102 according to an exemplary embodiment of the present invention. That is, the normal operation determining unit 102 controls the RF unit 110 to generate a transmission signal, measures a Direct Current (DC) signal level of a signal provided from the rectifying circuit 140, and compares the measured level with a preset reference level, thereby determining whether the FEM or the PAM operates normally. At this point, when the measured DC signal level is the same as the preset reference level, the normal operation determining unit 102 determines that both the FEM and the PAM operate normally. When the measured DC signal level is not the same as the preset reference level, the normal operation determining unit 102 determines that at least one of the FEM and the PAM operates abnormally.

The RF unit 110 processes an RF signal for transmission/reception to/from a different apparatus via the antenna 130 and the FEM 120. In a case where the mobile terminal supports 2.5 Generation (2.5G) and $3^{rd}$ Generation (3G) systems, the RF unit 110 may include a 2.5G module (not illustrated) that supports a 2.5G system, and a 3G module (not illustrated) that supports a 3G system. The RF unit 110 generates a transmission signal having a frequency band corresponding to a relevant system under control of the controller 100, and provides the transmission signal to the FEM 120. In addition, according to an exemplary embodiment of the present invention, the RF unit 110 receives a signal rectified by the rectifying circuit 140 and uses the signal as a feedback signal of a Power Amplifier (PA) (not illustrated) inside the RF unit 110. Here, the PAM (not illustrated) includes at least one PA (not illustrated), and may be included in the RF unit 110, or may be configured separately.

The FEM 120 performs switching according to a frequency band of a transmission/reception signal to transmit a transmission signal provided from the RF unit 110 via the antenna 130, and provides a reception signal provided from the antenna 130 to the RF unit 110. That is, the FEM 120 includes a switch. In a case where a current transmission/reception signal corresponds to a frequency band of the 2.5G system, the FEM 120 performs switching such that the antenna 130 is connected to the 2.5G module (not illustrated). In a case where a current transmission/reception signal corresponds to a frequency band of the 3G system, the FEM 120 performs switching such that the antenna 130 is connected to the 3G module (not illustrated). More particularly, according to an exemplary embodiment of the present invention, the FEM 120 isolates a transmission signal provided from the RF unit 110 to provide the same to the rectifying circuit 140. At this point, the FEM 120 may provide the isolated signal to the rectifying circuit 140 through a redundant port that is not connected to the RF unit 110 and the antenna 130.

The rectifying circuit 140 converts a signal input in the form of an alternating current from the FEM 120 into a direct current, and provides the same to the RF unit 110.

The storage unit 150 stores various programs for an overall operation of the mobile terminal, data, and a reference value used for determining whether the modules operate normally according to an exemplary embodiment of the present invention. In an exemplary implementation, the reference value denotes a value obtained by measuring a level of a transmission signal that is isolated through the redundant port and input to the controller 100 via the rectifying circuit 140 during a calibration process of the mobile terminal. Generally, all mobile terminals store an RF characteristic value of relevant terminals in a memory of the terminals during a calibration process. The reference value is also obtained and stored during the calibration process.

Hereinafter, an exemplary mobile terminal that supports the 2.5G system and the 3G system, that is, a mobile terminal that supports Quad Band Global System for Mobile communications (GSM)/Dual Band Wideband Code Division Multiple Access (WCDMA) will be described in more detail with reference to FIG. 2.

Figure 2:
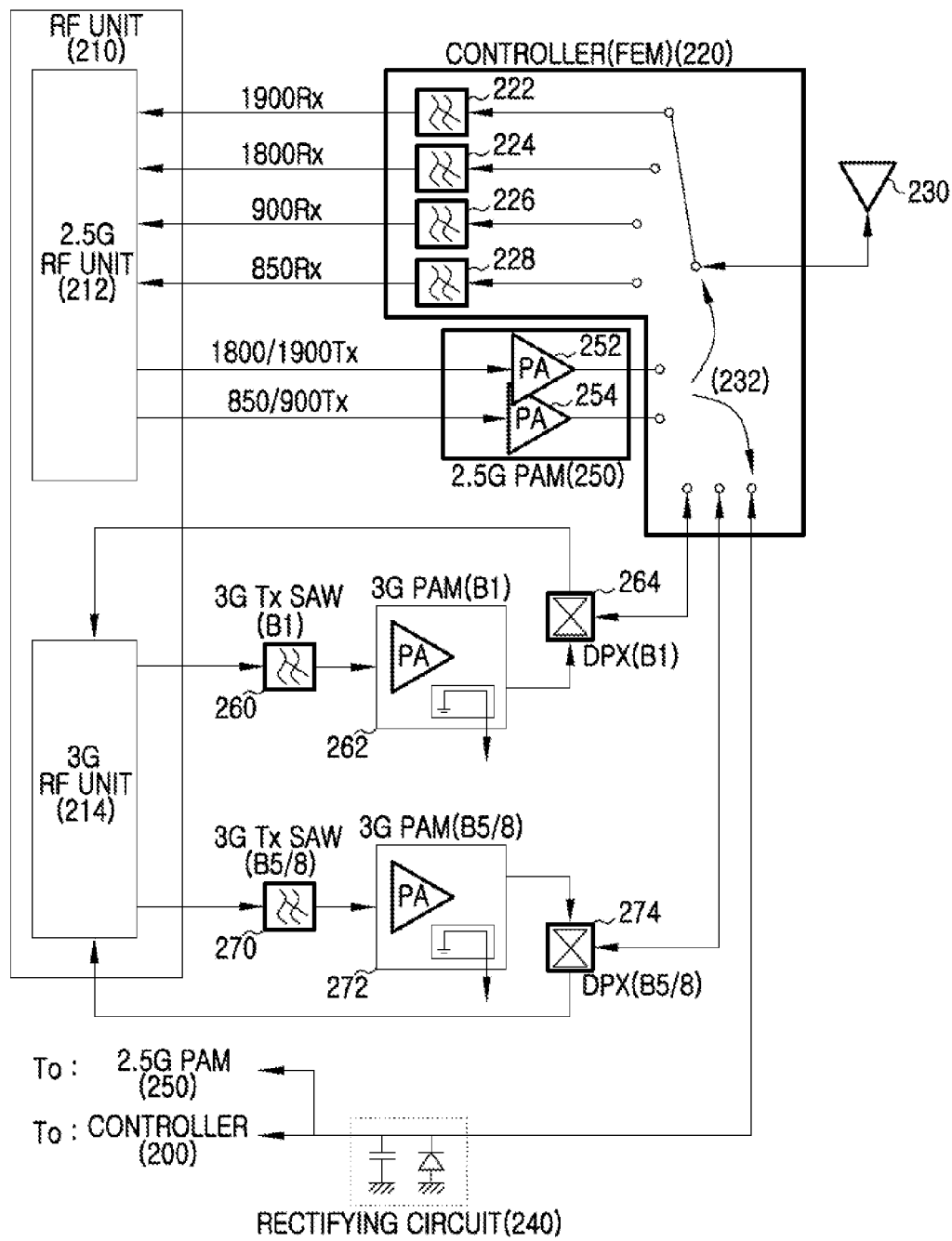
FIG. 2 is a block diagram illustrating a mobile terminal that supports 2.5 Generation (2.5G) and $3^{rd}$ Generation (3G) systems according to an exemplary embodiment of the present invention.

FIG. 2 is a block diagram illustrating a mobile terminal that supports 2.5G and 3G systems according to an exemplary embodiment of the present invention.

Referring to FIG. 2, the mobile terminal includes an RF unit 210, an FEM 220, an antenna 230, a 2.5G PAM 250, 3G Transmit (Tx) Surface Acoustic Wave (SAW) units 260 and 270, 3G PAMs 262 and 272, and Duplexers (DPXs) 264 and 274. In addition, the RF unit 210 includes a 2.5G RF unit 212 and a 3G RF unit 214. The FEM includes four band pass filters 222, 224, 226, and 228. Here, the 2.5G PAM 250 may be included in the 2.5G RF unit 212, and the 3G Tx SAW units 260 and 270, the 3G PAMs 262 and 272, and the DPXs 264 and 274 may be included in the 3G RF unit 214.

The RF unit 210 includes the 2.5G RF unit 212 that supports the 2.5G system and the 3G RF unit 214 that supports the 3G system, and generates a transmission signal having a frequency band corresponding to a relevant system, or receives a reception signal from the FEM 220 under control of a controller (not illustrated).

The 2.5G PAM 250 includes two PAs 252 and 254, and amplifies a transmission signal generated by the 2.5G RF unit 212 to a preset power level and provides the same to the FEM 220. At this point, the 2.5G PAM 250 receives a signal rectified by the rectifying circuit 240 and uses the signal as a feedback signal of the two PAs 252 and 254, thereby controlling an amplification degree of a transmission signal. In addition, the 2.5G PAM 250 may be included in the 2.5G RF unit 212.

Each of the 3G Tx SAW units 260 and 270 passes only a signal in a preset band among transmission signals generated by the 3G RF unit 214, and provides the same to each of the 3G PAMs 262 and 272. The 3G PAMs 262 and 272 amplify an input signal to a preset power level, and outputs the same to the DPXs 264 and 274. Here, each of the 3G PAMs 262 and 272 includes a PA and a coupler, and amplifies a signal to a preset power level through the PA, and uses the amplified signal as a feedback signal of the PA to control an amplification degree of the PA using the coupler. The DPXs 264 and 274 provide a transmission signal provided from the 3G PAMs 262 and 272 to the FEM 220, and provide a reception signal from the FEM 220 to the 3G RF unit 214 according to a duplexing scheme.

The FEM 220 performs switching according to a frequency band of a transmission/reception signal to transmit a transmission signal provided via a plurality of input/output ports via the antenna 230, and provide a reception signal provided from the antenna 230 to an output port of the plurality of input/output ports that is connected to a relevant system. For example, in a case of transmitting a signal having a frequency band of the 2.5G system, the FEM 220 performs switching such that the antenna 230 is connected to the 2.5G PAM 250. In a case of transmitting a signal having a frequency band of the 3G system, the FEM 220 performs switching such that the antenna 230 is connected to one of the DPXs 264 and 274. More particularly, according to an exemplary embodiment of the present invention, the FEM 220 isolates (232) a transmission signal provided from the 2.5G PAM 250 or the DPXs 264 and 274 to provide the signal to the rectifying circuit 240 via a redundant port. Currently, since one input/output port for realizing a triple band WCDMA remains at the FEM of the mobile terminal that supports quad band GSM/dual band WCDMA, an exemplary embodiment of the present invention provides the isolated signal to the rectifying circuit 240 using the input/output port remaining at the FEM 220.

The rectifying circuit 240 converts a signal input in the form of an alternating current from the FEM 220 into a direct current, and provides the same to the controller 200 (not illustrated) or the 2.5G PAM 250.

Figure 3:
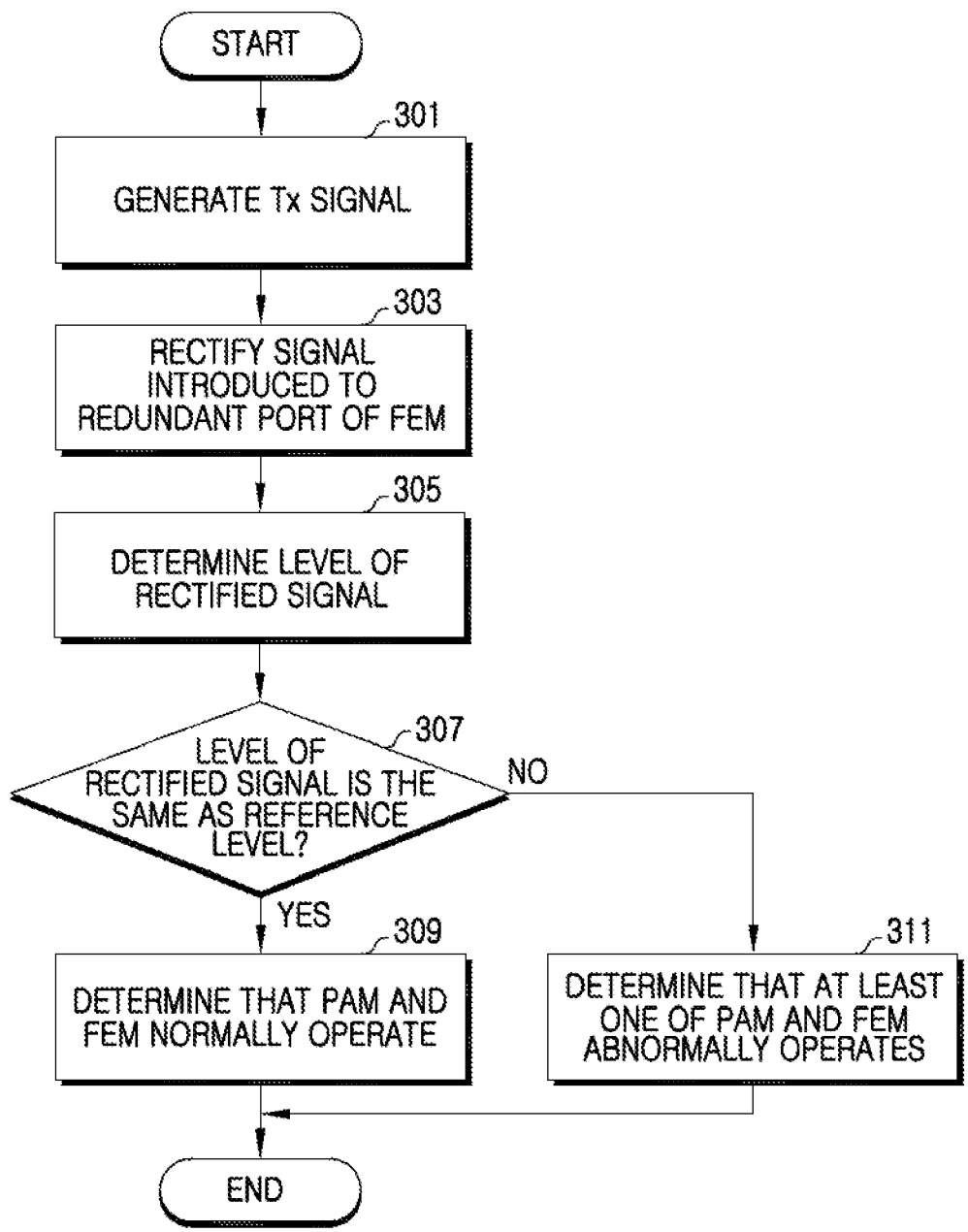
FIG. 3 is a flowchart illustrating a procedure for determining whether a Front End Module (FEM) or a Power Amplifier Module (PAM) operate normally in a mobile terminal according to an exemplary embodiment of the present invention.

FIG. 3 is a flowchart illustrating a procedure for determining whether an FEM or a PAM operates normally in a mobile terminal according to an exemplary embodiment of the present invention.

Referring to FIG. 3, the mobile terminal generates a Tx signal in step 301. Here, the mobile terminal may generate the Tx signal of a frequency band corresponding to a software key string input by a user. The mobile terminal isolates the transmission signal at an FEM, outputs the same to a redundant port, and rectifies the output alternating current to obtain a direct current signal in step 303. The mobile terminal measures a level of the rectified signal in step 305, and determines whether the level of the rectified signal is the same as a preset reference level in step 307.

If it is determined that the level of the rectified signal is the same as the preset reference level, the mobile terminal determines that the PAM and the FEM provided to the mobile terminal operate normally in step 309, and ends the algorithm.

In contrast, if it is determined that the level of the rectified signal is not the same as the preset reference level, the mobile terminal determines that at least one of the PAM and the FEM provided to the mobile terminal operates abnormally in step 311, and ends the algorithm.

Here, in a case where the mobile terminal is a mobile terminal that supports both the 2.5G system and the 3G system, the mobile terminal may generate a transmission signal corresponding to each system to determine whether the PAM that amplifies a transmission signal of a relevant system operates normally.

In addition, although a transmission signal is used to determine whether the PAM and the FEM operate normally in the above description, a reception signal may be used to determine whether the FEM operates normally. That is, it is possible to determine whether the FEM operates normally by allowing the FEM to isolate the reception signal and output the same to a redundant port and by measuring a level of the signal as in the case of the transmission signal. In addition, it is possible to determine that one of the PAM and the FEM operates abnormally by using a result from determining whether the modules operate normally using the transmission signal and by using a result from determining whether the modules operate normally using the reception signal. For example, in a case where it is determined that one of the PAM and the FEM operates abnormally as a result of using a transmission signal, and that the FEM operates normally as a result of using a reception signal, it is revealed that the PAM of the mobile terminal operates abnormally.

Figure 4:
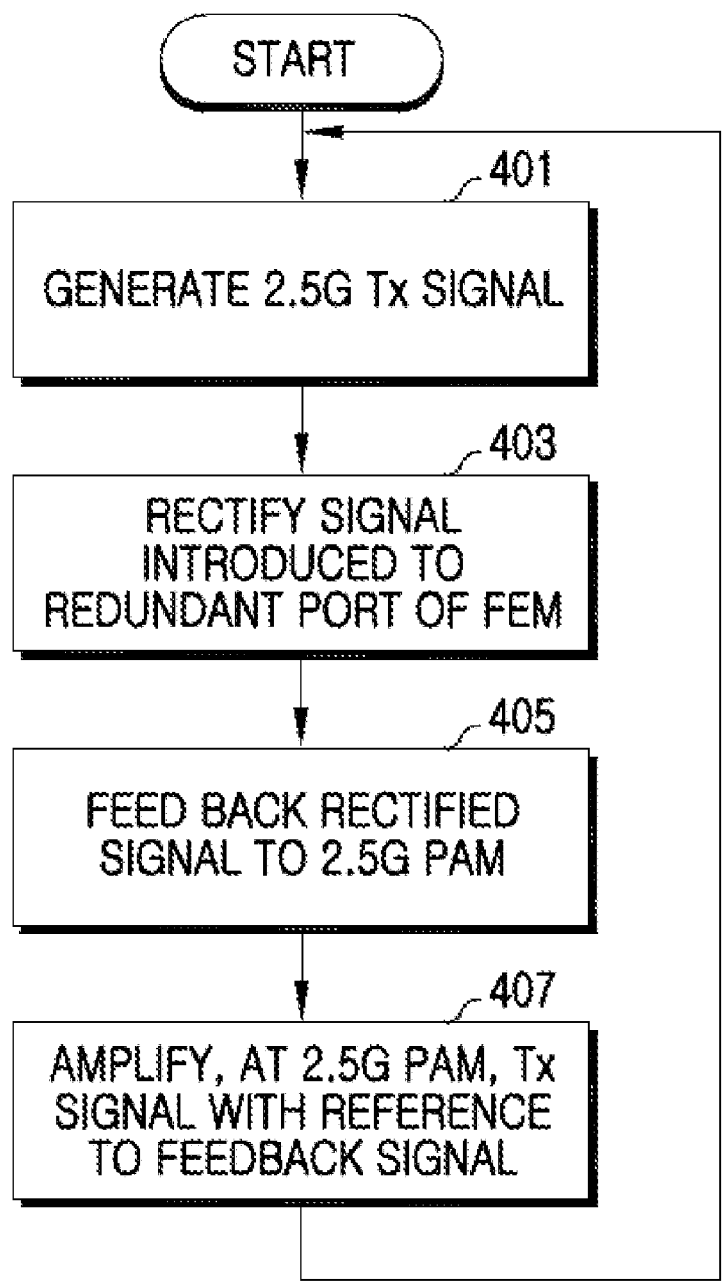
FIG. 4 is a flowchart illustrating a procedure for amplifying a transmission signal in a mobile terminal according to an exemplary embodiment of the present invention.

FIG. 4 is a flowchart illustrating a procedure for amplifying a transmission signal in a mobile terminal according to an exemplary embodiment of the present invention.

Referring to FIG. 4, the mobile terminal generates a transmission signal in step 401. The mobile terminal isolates the transmission signal at an FEM and outputs the signal to a redundant port, and rectifies the output alternating current to obtain a direct current signal in step 403.

The mobile terminal feeds back the rectified signal to a PAM in step 405, and controls an amplification degree of a transmission signal with reference to the feedback signal at the PAM in step 407. For example, when a level of the feedback signal is less than a threshold level, the PAM increases the amplification degree of the transmission signal. When the level of the feedback signal is greater than the threshold level, the PAM decreases the amplification degree of the transmission signal.

The mobile terminal returns to step 401 and performs the subsequent steps.

According to exemplary embodiments of the present invention, a mobile terminal may determine whether an FEM or a PAM operates normally by measuring a level of a transmission signal through a redundant port of the FEM and comparing the level with a reference level. Therefore, unnecessary replacement of a hardware unit is prevented, and monetary waste may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining whether a mobile terminal operates normally, the method comprising:
   generating a transmission signal;
   isolating, at a Front End Module (FEM), the transmission signal provided to an antenna and outputting the same;
   providing, at the FEM, a reception signal from the antenna;
   measuring a level of the output signal; and
   comparing the measured level of the output signal with a preset threshold level to determine that at least one of a Power Amplifier Module (PAM) and the FEM operates normally,
   wherein the FEM comprises a switch for switching according to a frequency band of at least one of the transmission signal and the reception signal to correspondingly at least one of transmit the transmission signal to the antenna and provide the reception signal from the antenna.

2. The method of claim 1, wherein the determining that at least one of the PAM and the FEM operates normally comprises:
   when the measured level of the output signal is the same as the preset threshold level, determining that the PAM and the FEM operate normally; and
   when the measured level of the output signal is not the same as the preset threshold level, determining that at least one of the PAM and the FEM operates abnormally.

3. The method of claim 1, further comprising rectifying the signal output from the FEM to change the signal from an alternating current to a direct current.

4. The method of claim 1, further comprising receiving, at the PAM, the signal output from the FEM as a feedback to control an amplification degree of a transmission signal.

5. The method of claim 4, wherein the PAM comprises at least one Power Amplifier (PA).

6. The method of claim 5, further comprising:
   if a level of the feedback is less than a threshold level, increasing the amplification degree of the transmission signal; and
   if a level of the feedback is greater than the threshold level, decreasing the amplification degree of the transmission signal.

7. The method of claim 1, further comprising:
   switching such that the antenna is connected to a 2.5 Generation (2.5G) module, when the at least one of the transmission and the reception signal corresponds to a frequency band of a 2.5G system; and
   switching such that the antenna is connected to a 3$^{rd}$ Generation (3G) module, when the at least one of the transmission and the reception signal corresponds to a frequency band of a 3G system.

8. The method of claim 1, wherein the generating of the transmission signal comprises generating a transmission signal of a frequency band corresponding to a software key string input by a user.

9. An apparatus for determining whether a mobile terminal operates normally, the apparatus comprising:
   a Radio Frequency (RF) unit for generating a transmission signal;
   a Front End Module (FEM) for providing the transmission signal generated by the RF unit to an antenna, for isolating the transmission signal provided to the antenna and for outputting the same, and for providing a reception signal from the antenna to the RF unit; and
   a controller for measuring a level of the signal output from the FEM, and for comparing the measured level of the output signal with a preset threshold level to determine that at least one of a Power Amplifier Module (PAM) and the FEM operates normally,
   wherein the FEM comprises a switch for switching according to a frequency band of at least one of the transmission signal and the reception signal to correspondingly at least one of transmit the transmission signal to the antenna and provide the reception signal from the antenna to the RF unit.

10. The apparatus of claim 9, wherein the controller determines that the PAM and the FEM operate normally when the measured level of the output signal is the same as the preset threshold level, and determines that at least one of the PAM and the FEM operates abnormally when the measured level of the output signal is not the same as the preset threshold level.

11. The apparatus of claim 9, further comprising a rectifying circuit for rectifying the signal output from the FEM to change the signal from an alternating current to a direct current.

12. The apparatus of claim 9, wherein the PAM receives a signal output from the FEM as a feedback to control an amplification degree of a transmission signal.

13. The apparatus of claim 12, wherein the PAM comprises at least one Power Amplifier (PA).

14. The apparatus of claim 13, wherein, if a level of the feedback is less than a threshold level, the PAM increases the amplification degree of the transmission signal, and
   wherein, if a level of the feedback is greater than the threshold level, the PAM decreases the amplification degree of the transmission signal.

15. The apparatus of claim 9, wherein, in a case where the at least one of the transmission and the reception signal corresponds to a frequency band of a 2.5 Generation (2.5G) system, the FEM switches such that the antenna is connected to a 2.5G module, and
   wherein, in a case where the at least one of the transmission and the reception signal corresponds to a frequency band of a 3$^{rd}$ Generation (3G) system, the FEM switches such that the antenna is connected to a 3G module.

16. The apparatus of claim 9, wherein the RF unit generates a transmission signal of a frequency band corresponding to a software key string input by a user.

* * * * *